United States Patent [19]

Nagamura

[11] 3,940,149
[45] Feb. 24, 1976

[54] TONEARM LINEAR-DRIVE APPARATUS
[76] Inventor: Fumitaka Nagamura, 1-6-14 Tomigaya, Shibuya, Tokyo, Japan
[22] Filed: Feb. 4, 1974
[21] Appl. No.: 439,575

[30] Foreign Application Priority Data
Feb. 10, 1973  Japan.............................. 48-016771

[52] U.S. Cl............................................. 274/23 A
[51] Int. Cl.²........................................... G11B 3/10
[58] Field of Search....................................... 274/23

[56] References Cited
UNITED STATES PATENTS

| | | | |
|---|---|---|---|
| 1,868,304 | 7/1932 | Cargill............................ | 274/23 R |
| 2,676,808 | 4/1954 | Masterson....................... | 274/23 A |
| 2,915,315 | 12/1959 | Rabinow.......................... | 274/23 A |
| 3,249,361 | 5/1966 | Rabinow.......................... | 274/23 A |
| 3,249,362 | 5/1966 | Rabinow.......................... | 274/23 A |

Primary Examiner—Robert I. Smith
Assistant Examiner—John W. Shepperd
Attorney, Agent, or Firm—Wallenstein, Spangenberg, Hattis & Strampel

[57] ABSTRACT

There is disclosed a tonearm linear-drive apparatus wherein the pivotal point of the tonearm is moved in the linear direction which is parallel with the pickup stylus linearly moving direction across the record disc being played, by using at least a portion of gravity force. A sliding mechanism having the tonearm supported at the pivot point is provided adapted to slide along a linear track by the portion of gravity force in the same direction as that of the linear movement of the pivotal point of the tonearm. A braking mechanism is provided responsive to the above stylus movement and the above pivotal point movement for starting and stopping the above sliding mechanism movement.

4 Claims, 1 Drawing Figure

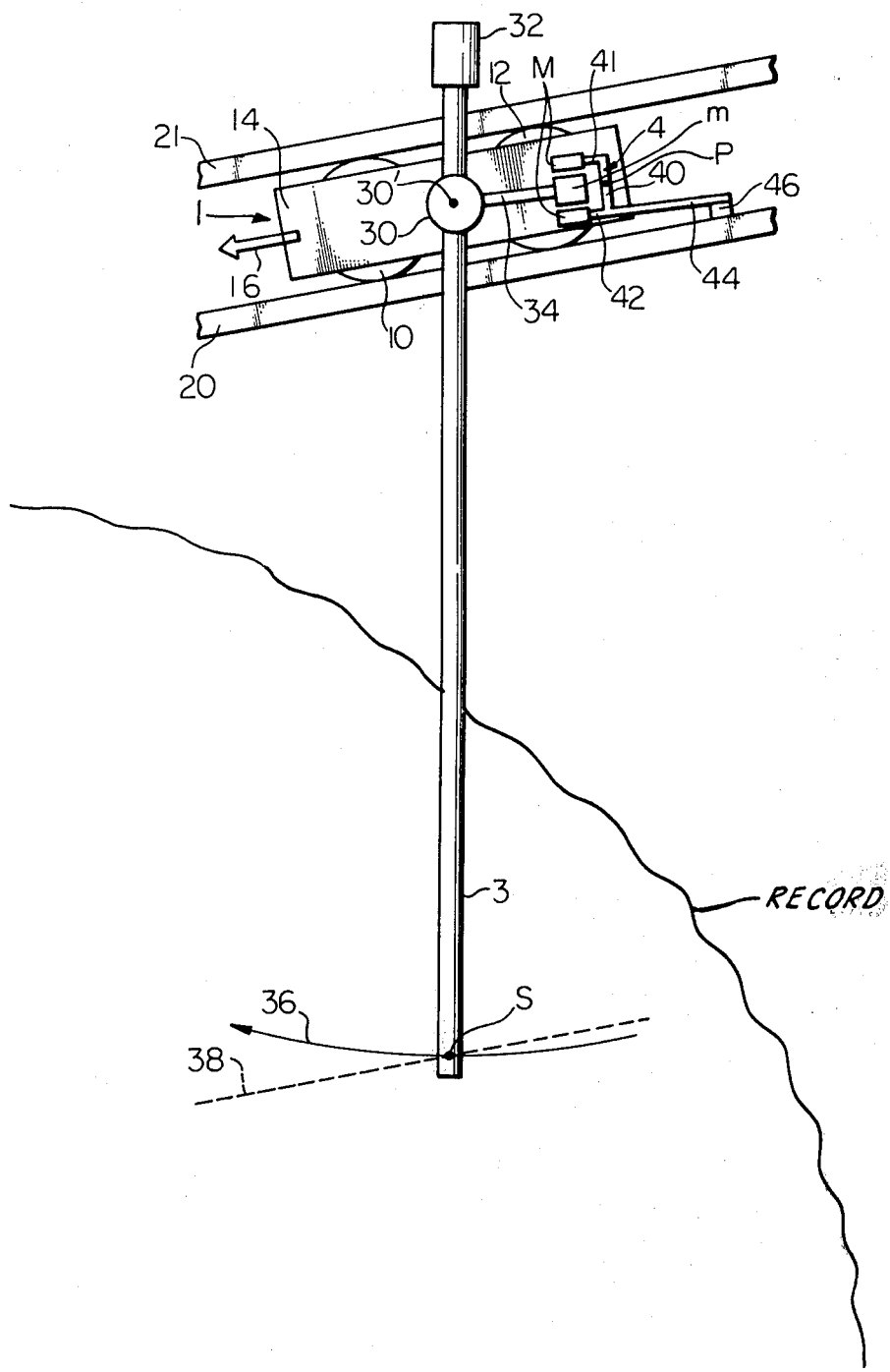

TONEARM LINEAR-DRIVE APPARATUS

BACKGROUND OF THE INVENTION

This invention relates to a tonearm linear-drive apparatus, and, more particularly to such apparatus wherein a linear-drive force for the tonearm is derived from at least a portion of gravity.

In a pivoted arm system in which the tonearm is rotated about its pivotal point which is stationary in position with respect to the rotating axis of the disc, it is known that, since the disc has a sound groove thereon which has been formed upon cutting of the master record disc by driving the cutter head linearly across the master record disc, various disadvantages including generation of tracing distortions, for example, appear when such record disc is re-produced.

In order to overcome above disadvantages, a tonearm linear-drive system was developed wherein the pivotal point of the tonearm was moved in response to the movement of the stylus tip due to pulling force by the groove of the rotating disc so as to permit the stylus tip to move linearly across the disc. In this prior system, the pivotal point of the tonearm was designed to linearly move step by step with small increment of the stylus tip movement toward the center of the disc, because the speed of such stylus tip movement is not constant in time. This linear movement of the pivotal point of the tonearm was carried out by using an electric motor.

Therefore, one object of this invention is to provide means for permitting the pivotal point of the tonearm to linearly move in the same manner as in the prior art system, without using an electric motor or any other driving source.

The other object of this invention is to provide means for causing step by step linear movement of the pivotal point of the tonearm in very simple manner.

SUMMARY OF THE INVENTION

In order to achieve the above and the other objects, this invention is embodied as a tonearm linear-drive apparatus comprising a sliding mechanism adapted to linearly move along a linear track by at least a portion of gravity force, said sliding mechanism having the tonearm pivotally mounted thereto, and a braking mechanism having a braking member also pivotally mounted to the sliding mechanism, said braking member receiving the stylus tip movement substantially toward the center of the disc with respect to the pivotal point of the arm and the tonearm pivotal point linear movement with respect to the stylus tip point through space transmission means, to start and stop the sliding mechanism movement step by step.

Therefore, in accordance with this invention, since no special driving device such as an electric motor for drive the pivotal point of the arm linearly is not used in this invention, the cost of the apparatus will be reduced and the construction also be simple. Further, the control mechanism for the tonearm linear-drive means can be constructed in a very simple manner.

BRIEF DESCRIPTION OF THE DRAWING

This invention will be explained in detail hereinafter by using a single drawing showing diagrammatically the tonearm linear-drive mechanism as one embodiment of this invention in connection with a record player in which the disc is rotated in substantially a vertical mode.

DETAILED DESCRIPTION OF THE INVENTION

Referring to FIGURE showing the tonearm linear-drive apparatus according to the invention which comprises in general a sliding mechanism 1 slidably supported between a pair of parallel rails 20 and 21. The sliding mechanism 1 has two rollers 10 and 12 which are tandem connected by a connecting member 14 in the form of a plate. At a middle point of the plate 14, a tonearm 3 is pivotally mounted through a suitable conventional universal joint member 30 which may be of a gyro balance type. Such middle point of the plate acts as a pivotal point 30' for the tonearm 3. Thus, the stylus S adapted to be attached to one end of the tonearm 3 can move freely therewith about the pivotal point 30' along the surface of the disc. The other end of the arm 3 has a suitable weight member 32 which acts to provide a proper pressure of the stylus tip against the disc.

In the embodiment as shown, the disc is supported for rotation about an axis tilted at a small angle with respect to the perpendicular plane, and the tonearm 3 is mounted to the sliding mechanism 1 through the joint member 30 so that the tonearm extends substantially in parallel with the disc surface so supported. Thus the parallel rails 20 and 21 are inclined at a small angle with respect to the horizontal plane so that the sliding mechanism 1 can slide therebetween in the direction as indicated by an arrow 16, by gravity.

Attached to the joint member 30 of the arm 3 and extending orthogonally therefrom is a rod 34 having at its free end a magnet m fixed thereto. A braking member 40 is pivotally mounted on the plate 14, and can rotate about a pivotal point P. The braking member 4 has two legs 41 and 42 each having its free end a magnet M fixed thereto. The magnet m of the rod 34 of the arm 3 is interposed between the magnets M of the braking member 40. The magnet m has its polarity such that it can be expelled by both magnets M, the magnet m is always positioned at the middle point between the magnets M. The leg 42 of the braking member 40 has an extension 44 having at its free end a braking pad 46 attached thereto, which adapted to engage the rail 20 when the braking member 40 is rotated clockwise. A space transmission means comprising the magnet m and the magnet pair M thus positioned acts as a buffer or cushion between the rod 34 and the braking member 40. Therefore, by providing such space transmission means, it is possible that harmful effects as produced by interaction between the stylus tip and the side walls of the groove in the disc are prevented.

Now, assuming that the pivotal point 30' of the arm 3 is stationary in position, the stylus tip S moves with the arm by the pulling force of the groove of the rotating disc, in the direction as shown by an arrow 36 along the circumference defined by a circle having its radius corresponding to the distance between the positions of the stylus and the pivotal point. In the linear-drive arm system, when the stylus tip moves by a predetermined small distance due to the pivotal movement of the arm, the pivotal point of the arm also moves in the same direction in response thereto by a predetermined small distance substantially in the direction of that of the stylus tip movement which has just made. This is an operation of a general linear-drive arm system.

In accordance with this invention, such movement of the pivotal point of the tonearm is effected by using at least a portion of gravity. Assuming that the stylus tip 3 is engaging the groove of the rotating disc and the braking mechanism 4 is operating with the braking pad 46 contacting the rail surface, to stop the movement of the sliding mechanism 1. In this condition, when the stylus S advances by a predetermined incremental distance substantially across the disc by pulling or guiding force of the groove so as thereby to rotate the arm 3 clockwise, the rod 34 is rotated clockwise an incremental amount. Since the magnet m on the rod 34 remains at the middle point between the pair of magnets M of the braking member 40, the braking member 40 is rotated counterclockwise an incremental amount by the magnetic transmission force involved to cause disengagement of the braking pad 46 with the rail surface. The sliding mechanism 1 then moves a short distance in the direction of the arrow 16 by force of gravity which causes an incremental counterclockwise rotation of the tonearm 33 and a corresponding clockwise rotation of braking member 40 to cause engagement of the braking pad with the rail surface and the terminates of movement by gravity of the sliding mechanism 1. Therefore, the stylus S is moved substantially along a dotted line 38 which is parallel with the sliding track of the rails 20 and 21 and to the radius of the record disc.

Upon completion of playing, in order to return the arm 3 to an initial play position of the disc or to its locking position at the outside of the disc, the arm 3 is lifted up from the disc, and, by disengaging the braking pad from the rail surface, the rails are tilted in the opposite direction in a manual manner or by a suitable mechanical device. It is noted that, even though the arm is lifted up halfway in playing, the rod 34 of the arm is only rotated about its longitudinal axis, so that the braking action of the braking mechanism can be maintained.

The tonearm linear-drive mechanism of this invention has been explained in connection with the record player in which the record disc is intended to be substantially vertically driven. However, this invention cannot be limited only thereto, but it is equally applicable to a record player in which record discs are horizontally drived. In this case, it is merely needed to arrange the sliding mechanism 1 so that the arm becomes parallel with the record surface and to tilt the rails 20 and 21 at a small angle from the horizontal plane so that the sliding mechanism 1 can slide or roll therebetween in the indicated direction 16.

In the embodiment explained hereinabove and shown in the drawing the braking member 40 is explained having the braking pad adapted to selectively engage the stationary surface such as the rail surface, but it may be replaced with one having an electro-magnet means adapted to be selectively energized to carry out the same function as the braking pad.

What is claimed is:

1. In a record player for a rotatable disc record having a spiral groove, said record to be oriented in a given plane, and a tonearm provided with a stylus to track the record groove which pulls the tonearm in a generally radial direction parallel to the record disc, the improvement comprising a tonearm support apparatus including a carriage having pivot-forming means which pivotally supports said tonearm for pivotal movement in a plane generally parallel to the record disc, carriage guiding support means providing guide track means extending along an incline to the horizontal for supporting the carriage for free movement under force of gravity in said radial direction in the absence of a braking force on the carriage, and braking mechanism including braking means normally holding said carriage against movement when said tonearm has a given reference orientation in said plane and control means responsive to an incremental pivotal movement of said tonearm in said given direction for momentarily terminating the braking action of said braking means to permit incremental bodily movement of said carriage and the pivot point of said tonearm thereon in said radial direction by force of gravity, which bodily movement causes an incremental reverse pivotal movement of said tonearm on said carriage and re-establishment of the braking action of said braking means on said carriage until subsequent incremental pivotal movement of said tonearm in said given direction by said record disc groove.

2. The tonearm support apparatus of claim 1 wherein said control means includes a first magnetic member attached to said tonearm, a carriage brake operating member having second and third magnetic members connected to said braking member and supported on opposite sides of said first magnetic member wherein said first magnetic member is magnetically supported in spaced relation to said second and third magnetic members and an incremental pivotal movement of said tonearm in said radial direction from said reference orientation will result in said second and third magnetic members following said first magnetic member and imparting movement to said brake operating member which releases said braking means.

3. The tonearm support apparatus of claim 1 wherein said first magnetic member is attached to said tonearm adjacent to said pivot point, said braking means is a brake shoe which engages and disengages from a stationary surface on said carriage guiding support means and said carriage brake operating member is a pivoted member which moves said brake shoe into and out of engagement with said stationary surface when said pivotally mounted tonearm and brake operating members are moved into and out of given relative angular positions.

4. The tonearm support apparatus of claim 1 wherein said carriage means includes roller means riding on said guide track means, the portion of said guide track means engaged by said roller means being inclined with respect to the horizontal.

* * * * *